Nov. 8, 1960 J. B. ROLFE 2,959,408
WEIGHING SCALE COUNTERPOISE APPARATUS
Filed June 20, 1956 5 Sheets-Sheet 1

Inventor
JOHN B. ROLFE
by: [signature]
Atty.

Nov. 8, 1960  J. B. ROLFE  2,959,408
WEIGHING SCALE COUNTERPOISE APPARATUS
Filed June 20, 1956  5 Sheets-Sheet 2

Fig.2

Inventor
JOHN B. ROLFE
by: *[signature]*
Atty.

Nov. 8, 1960 J. B. ROLFE 2,959,408
WEIGHING SCALE COUNTERPOISE APPARATUS
Filed June 20, 1956 5 Sheets-Sheet 5

Inventor
JOHN B. ROLFE

2,959,408
Patented Nov. 8, 1960

2,959,408

WEIGHING SCALE COUNTERPOISE APPARATUS

John B. Rolfe, St. Johnsbury, Vt., assignor to Fairbanks, Morse & Co., Chicago, Ill., a corporation of Illinois Filed June 20, 1956, Ser. No. 592,531

10 Claims. (Cl. 265—27)

This invention relates to weighing scales of the type in which a series of unit or counterpoise weights are employed to increase the capacity of the scale above its normal non-counterweighted capacity, and particularly to useful improvements whereby the increase in scale capacity is accomplished through the use of cam actuated lever systems.

It is old in the art of weighing scales to utilize counterpoise weights to increase the scale capacity above its normal original or non-counterweighted capacity. The usual mode employed to accomplish this is to arrange a series of weights, each equal by relative mass to the original scale capacity, in a position whereby said weights can be added to the scale weigh beam successively, in a counterpoise manner. Thus, whatever the original scale capacity, the addition of each weight to the weigh beam will increase the weighing capacity of the scale by the amount of the original scale capacity. For example, if the original scale capacity is 1,000 lbs., each unit weight is designed to act in a counterpoise relation to increase the capacity of the scale by 1,000 lbs., and if an ultimate scale capacity of 7,000 lbs. is desired, it would be necessary to utilize six unit weights, which on being added successively would increase the scale capacity by 1,000 lbs. for each weight added to the weigh beam, and when all were added, total 6,000 lbs. in counterweight which, plus the original scale capacity of 1,000 lbs., would result in a total scale capacity of 7,000 lbs.

Not so old, but nevertheless well established, in the art of weighing scales is the use of counterpoise weights, each equal by relative mass to a certain multiple of the scale capacity, whereby said weights may be added to the scale weigh beam singly and in combinations to increase the scale capacity the desired amount. For example, assume a scale with an original capacity of 1,000 lbs., having three counterpoise weights A, B, and C of varying size but each having a relative mass equal to a multiple of the scale capacity; A having a relative mass equal to the scale capacity, or 1,000 lbs., B having a relative mass equal to twice the scale capacity, or 2,000 lbs., and C having a relative mass equal to three times the scale capacity, or 3,000 lbs. By adding weight A alone to the scale weigh beam, in a counterpoise relation, the scale capacity would be increased by 1,000 lbs.; by adding B alone, the increase in scale capacity would be by 2,000 lbs.; and by adding C alone, the increase would be by 3,000 lbs. Now, if A and C were added in combination, the scale capacity would be increased by 4,000 lbs.; and if B and C were added the increase would be by 5,000 lbs., and finally, if A, B, and C were all added, the increase would be by 6,000 lbs. Thus, by the use of said three weights, either singly or in combination, the original scale capacity of 1,000 lbs. can be increased, in steps as desired, by 6,000 lbs., for a total capacity of 7,000 lbs.

It is apparent that the utilization of three weights used in combinations gives the same results, so far as increasing the scale capacity is concerned, as does the use of six weights used successively. However, it is not readily apparent, nor does it necessarily follow, that the use of three weights rather than six weights will, in itself, permit a more compact or efficient arrangement of scale parts. This is so, since the advantages derived from using weights in combinations is usually offset by the complexity and size of apparatus necessary to make such combinations effective, i.e., the operation of adding and removing said weights in determined sequences.

The present invention is concerned with providing, for a counterpoise system utilizing weights in combinations, an associated apparatus for adding and removing said weights to and from the scale weigh beam in a determined sequence to increase or decrease the then scale capacity, as desired. Said associated apparatus, which may be termed a cam-actuated lever system, is designed to augment the advantages present in using weights in combinations, whereby the entire counterpoise system is both compact in arrangement and efficient in operation.

As previously pointed out, the mere use of weights in combination to vary the scale capacity is not now a novel concept. Also, there are many existing structures and devices which can be utilized to operate such a counterpoise system. However, the prevailing wide use of series of counterweights used in a successive manner points up the failure to develope a workable weights-in-combination counterpoise system which is commercially practicable. This can be seen by a study of the art, in which, the arrangement of operating parts using the weights in combination system is not only space consuming but also, oftentimes, is too complex for the simple result desired.

Accordingly, the present invention while having for its general object the provision of a counterpoise system associated with a scale whereby the scale capacity can be varied to accommodate different loads, has for its main object the provision of an improved, compact and highly effective cam-actuated lever system for effecting the adding and removal of counterweights to and from the scale weigh beam to increase or decrease the scale weighing capacity, as desired.

A further object is to provide a cam-actuated counterpoise system wherein the counterweights are effective singly and in combinations through a determined sequence to vary the scale weighing capacity.

Another object is to provide a cam-actuated lever system for effecting the adding and removal of counterweights to and from the scale weigh beam in a determined sequence, wherein said determined sequence is dependent upon cam surfaces properly related one to another so as to actuate associated levers in a manner to add or remove counterweights to or from the scale weigh beam.

A still further object is to provide in a cam-actuated counterpoise system having counterweights effective in a determined sequence, a plurality of cam surfaces arranged in a concentric manner and related one to another so as to actuate associated cam followers in accordance with said determined sequence.

A yet further object is to provide a cam-actuated counterpoise system for effecting the adding and removing of counterweights to and from the scale weigh beam in a determined sequence to vary the scale weighing capacity, and to coordinate the scale chart to such change in capacity whereby, at any stage in said sequence, the scale chart reflects the then scale weighing capacity.

According to the general features of the present invention, and in one embodiment thereof, there is provided a series or group of counterweights, each having a relative mass equal to a multiple of the scale capacity. Said weights are operatively disposed adjacent the butt end of the scale weigh beam, and normally rest free of said weigh beam, being supported by associated lever arms. Cam surfaces arranged concentrically on a manually operated disk-like member, cooperate with cam followers mounted on the lever arms to actuate said lever arms in a determined sequence. Actuation of the lever arms is sufficient to transfer the counterweights to or from the weigh beam, singly and in combinations, to alter the counterpoise effect of said weights on said beam. The effective counterweights increase or decrease the then scale capacity as the case may be, and through associated means change the scale chart to conform to the present scale capacity condition.

Further objects, features, and advantages will appear or be apparent to one skilled in the art from the following description, reference being made to the accompanying drawings, in which.

Figure 1:
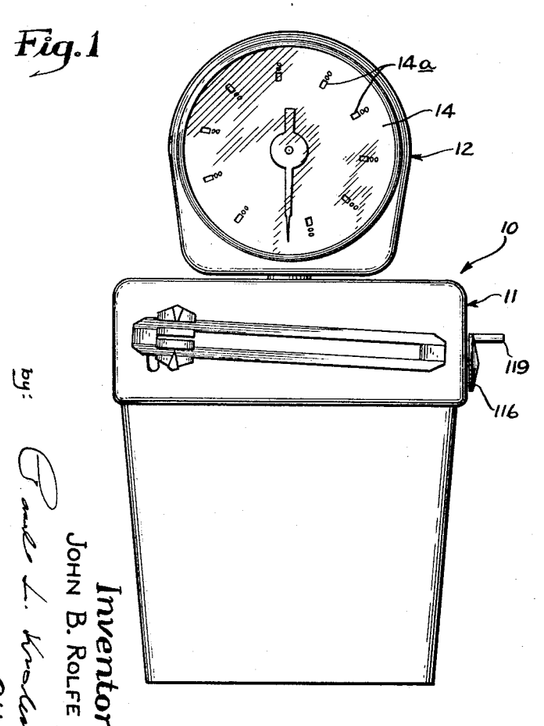
Fig. 1 is a front elevational view of a scale embodying the present invention.
Figure 2:
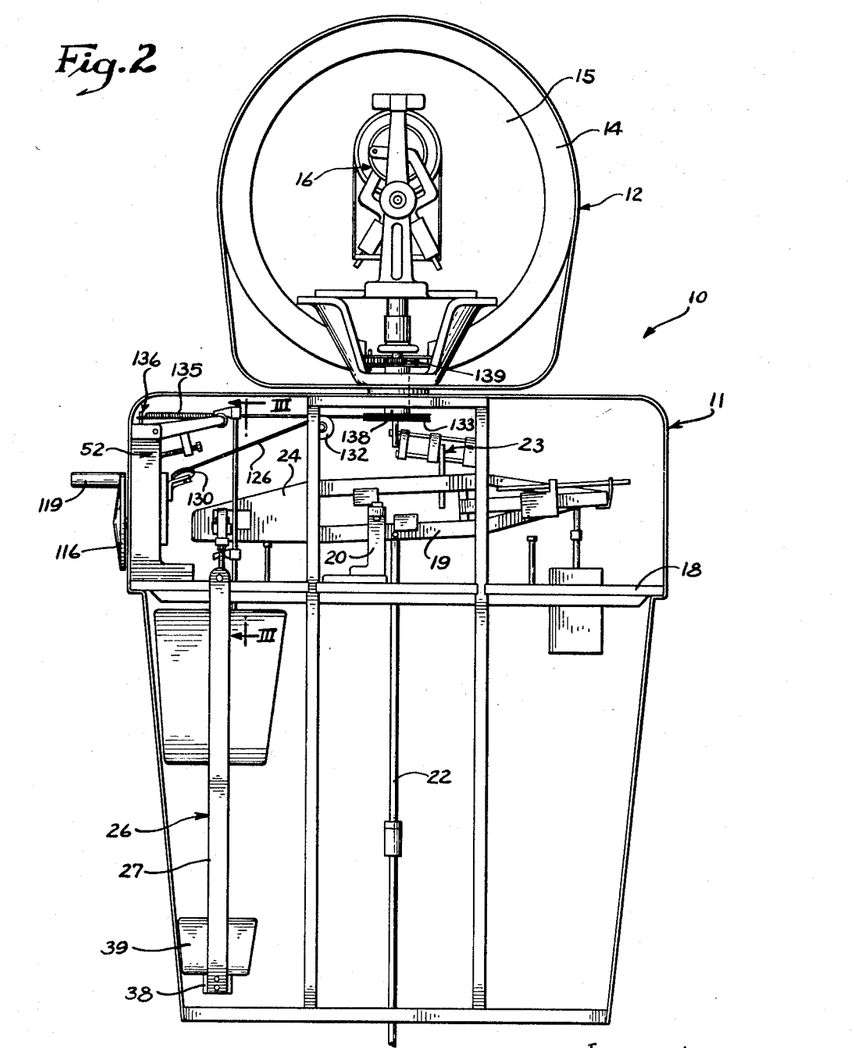
Fig. 2 is an enlarged elevational view of the back of the scale of Fig. 1 with the housing removed, to show the scale mechanism and the counterweights in operative position.

Referring now to the drawings, and particularly to Figs. 1 and 2, the reference numeral 10 designates a scale in which the weighing mechanism and unit weight mechanism, constructed according to the teaching of the present invention, are located. Surmounting the scale frame 11 is a circular dial head 12, within which are mounted to main or fixed dial 14, and annular auxiliary revolvable dial 15, coaxially mounted with the main dial, together with the usual automatic load conterbalancing mechanism 16. Mounted on a shelf 18 is the scale weigh beam 19, fulcrumed on the beam support 20 and connected by the pivotally mounted beam or load rod 22 to the usual lever system supporting a platform, not shown, as well as to the pointer of the main dial 14 by the connecting or auxiliary lever 23, for weight indication in a well known manner. The lever system, main and auxiliary dials, and automatic load conterbalancing mechanism do not form a part of this invention, and only those parts are shown and described which are necessary to a proper understanding of the operation of the improved counterpoise mechanism.

Figure 3:
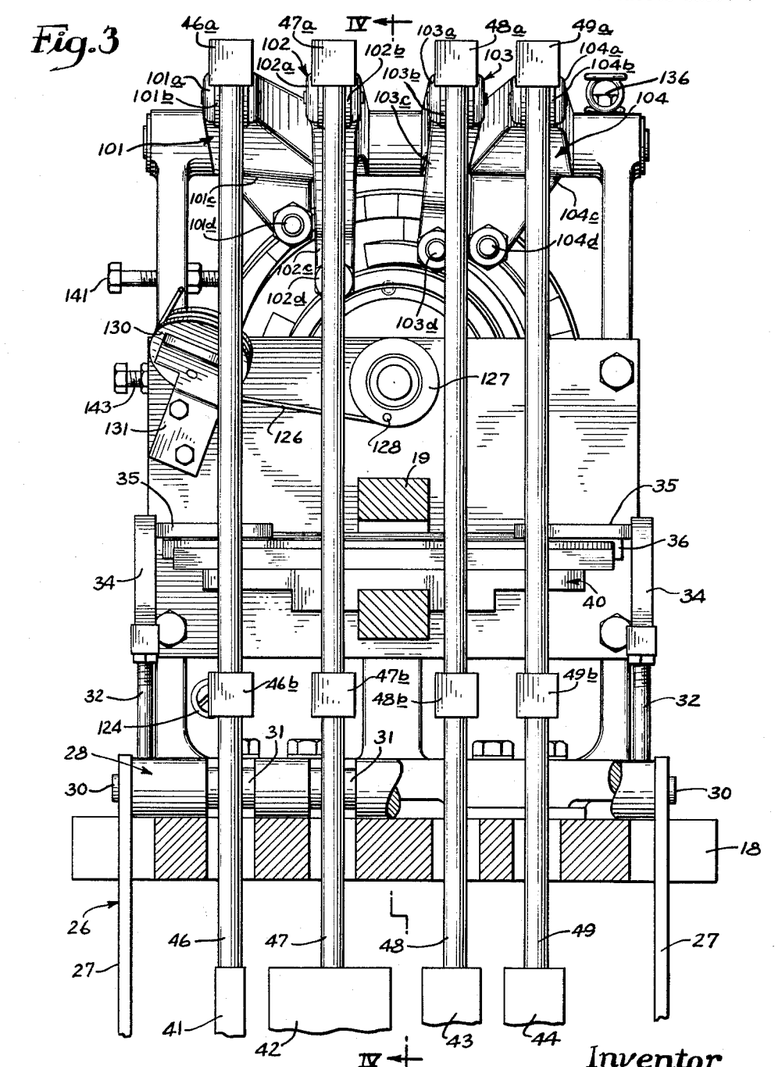
Fig. 3 is an enlarged fragmentary view taken substantially on line III—III of Fig. 2, showing the relative disposition of the members of the counterpoise mechanism.

Depending from the butt end 24 of scale weigh beam 19 is a carrier or sling 26, adapted to support unit weights in a counterpoise relation, as will be later described. As shown in Fig. 3, said carrier is provided with side or frame members 27, held in a spaced apart position by a cylindrical member or carrier brace 28, and secured thereto as by bolts 30. Brace 28 has specific portions 31 formed at a reduced diameter which, as will be explained, are the portions of said brace from which the unit weights are suspended when said weights are effective as counterweights. Extending upwardly from the carrier brace, and secured rigidly thereto, are support rods 32, which terminate in and are secured to carrier blocks 34. Said blocks have formed integrally therewith, and extending inwardly therefrom, bearing members 35, which are of the customary shape and composition as will cooperate with a knife-edge type bearing member 36 (see Fig. 4), carried by the weigh beam 19. Also, it may be noted, that the carrier side members 27 are joined together at their lowermost portions by a cross-bar 38 (Fig. 2), to which may be fixed the customary and permanent type counterweight 39, utilized in "balancing out" the scale to "zero" prior to load application and weighing.

Figure 4:
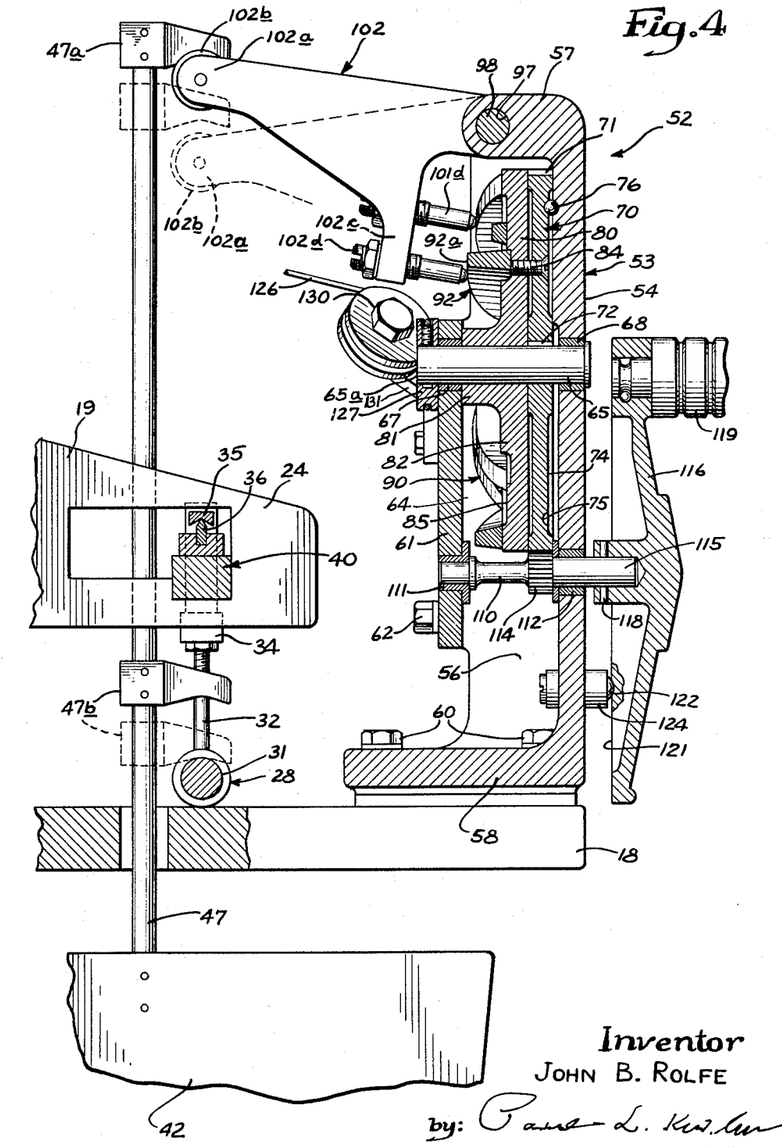
Fig. 4 is a sectional view taken substantially on line IV—IV of Fig. 3.

Referring particularly to Figs. 3 and 4, there is shown the knife-edge bearing member 36 mounted in a block or support member 40, said block being suitably secured, as by welding, to the scale weigh beam 19. It can be seen that through the bearing members 35 and 36, the carrier 26 is connected to the weigh beam and supported thereby, and any variation in weight of said carrier will be effective on the weigh beam in a counterpoise relation. The means for varying the effective weight of the carrier will now be described.

As shown in Figs. 2, 3, and 4, four counterweights 41, 42, 43, and 44 are disposed in a position between carrier side members 27 and below the shelf 18. Each weight 41, 42, 43, and 44 has secured integrally therewith a weight rod, 46, 47, 48, and 49, respectively, which extends upwardly and alongside the carrier brace 28, each weight rod being provided with an upper bracket 46a, 47a, 48a, and 49a, respectively, and a lower bracket 46b, 57b, 48b, and 49b, respectively. As will be explained more fully later, the said brackets constitute the support means by which their respective weights are transferred to and from the carrier 26.

Disposed adjacent the butt end 24 of weigh beam 19 is a cam-actuated lever mechanism 52. Said mechanism is operatively mounted on a frame member 53, comprising a back plate or main portion 54, side flanges 56, a top portion or web 57, and a bottom portion or base 58, said base resting on and being secured to shelf 18, as by bolts 60. A front plate member 61 is secured, as by bolts 62, to the side flanges 56 in a manner whereby to form an enclosure 64, with said front plate 61 and back plate 54 being disposed in parallel relation one to the other. As seen clearly in Fig. 4, a shaft 65 suitably journalled in front plate 61 and back plate 54, as by bushings 67 and 68, respectively, has mounted thereon two circular members 70 and 80. Member 70, which may be termed a gear or drive element, has formed on the outer periphery thereof gear teeth 71, and is secured to shaft 65 by a suitable key and keyway arrangement, as indicated at 72. The face 74 of said gear element, which is adjacent the back plate 54, is formed to provide a circular groove or bearing race 75 to accommodate a plurality of bearing balls, such as ball 76, which are retained in said back plate. Said bearing balls while facilitating movement of the gear element relative to the back plate, an operation to be subsequently described, also prevent wobble or lateral movement of said gear element.

Member 80, disposed immediately adjacent the gear element 70, is formed to provide a hub portion 81 and a radially extending disk-like portion 82. As shown, hub portion 81 fits free on shaft 65, while member 80 abuts gear element 70 and is secured thereto by a plurality of screws or bolts, such as indicated at 84. Thus, the gear element 70 and member 80 are directly and positively connected one to the other, and any rotary movement of the gear element, to be described, will impart similar and equal movement to member 80. Formed on face 85 of member 80, and suitably secured thereto as to be integral therewith, is a group of cam surfaces, indicated generally by the reference numeral 90. As can best be seen in the diagrammatic view of Fig. 5, the group of cam surfaces, in fact, comprise four circular cam surfaces or cam tracks, arranged concentrically, and designated for purposes of explanation by reference numerals 91, 92, 93, and 94. Each of the circular cam surfaces or tracks 91, 92, 93, and 94, is formed to provide high portions 91a, 92a, 93a, and 94a, respectively, and low portions 91b, 92b, 93b, and 94b, respectively, having intermediate, inclined transition portions 91c, 92c, 93c, and 94c, respectively. In Fig. 6 there is shown, without regard to actual scale, a diagrammatic development of the four cam surfaces, which indicates the high and low portions of each cam surface and their relation to the high and low portions of the other cam surfaces.

Referring once again to Figs. 3 and 4, the web or top portion 57 of frame member 53 is formed with a bore 97 in which there is disposed a shaft or rod 98. Pivotally connected to said rod are four lever arms 101, 102, 103, and 104, which extend in a more-or-less horizontal manner to terminate in end portions 101a, 102a, 103a, and 104a, respectively, being provided thereat with rollers 101b, 102b, 103b, and 104b, respectively. Each lever arm 101, 102, 103, and 104 has depending therefrom a bracket or leg portion 101c, 102c, 103c, and 104c, respectively, which carries or has fixed thereto a cam follower 101d, 102d, 103d, and 104d, respectively. As will be explained more fully later, the lever rollers 101b, 102b, 103b, and 104b, are aligned with and carry the upper weight brackets 46a, 47a, 48a, and 49a, respectively, whereas the cam followers 101d, 102d, 103d, and 104d, are associated with and follow the surface patterns of cams 91, 92, 93, and 94, respectively.

As best seen in Fig. 4, a shaft 110 disposed adjacent the outer periphery of gear element 70 and suitably journalled in plates 61 and 53, as by bushings 111 and 112, respectively, is provided with a pinion 114 which is in mesh with the gear teeth 71 of said gear element. End portion 115 of shaft 110 extends beyond plate 53 and has mounted thereon a disk or wheel 116, said wheel being secured to the shaft 110 by pin member 118, and having a handle 119 rotatably mounted near the outer periphery thereof. Also, on rim face 121 of wheel 116 is a plurality of detents, such as detent 122, arranged in a circular pattern and which cooperate with a spring-urged ball member 124 to provide a type of indexing means well known in the art. Said indexing means is designed to hold wheel 116 in positions corresponding to positions of the cam surfaces 91, 92, 93, and 94 when said cams are effective, i.e., when the detent cooperates with the ball to hold the wheel, the cam followers are on high or low portions of their respective cam surfaces, and never on a transitional inclined surface.

Before describing the operation of the cam-actuated lever mechanism in terms of actual weights, cam sequences, and varied scale weighing capacity, reference is made once more to Fig. 4 for a brief description of said mechanism and the operation which transfers a single counterweight to or from the weigh beam, it being understood that each counterweight and its related elements operates in a similar manner. Thus, cam follower 102d resting on high portion 92a of cam surface 92 acts through lever arm 102, pivotable about rod 98, to dispose lever end portion 102a in the position as shown in solid lines. In such position roller 102b, carried by end portion 102a, engages upper bracket 47a of weight rod 47, and thereby supports counterweight 42. It should be noted that when lever arm 102 is supporting the counterweight 42, the lower bracket 47b of weight rod 47 is disposed a considerable distance above the carrier brace 28; in fact, since carrier brace 28 is connected to and moves in accordance with movement of weigh beam 19, lower bracket 47b must be held clear of brace 28 a distance slightly greater than the maximum of movement of weigh beam end 24. Thus, in this "weight off" position, i.e., when counterweight 42 is supported by lever arm 102, said counterweight is not effective as regards the weigh beam, nor as regards the scale weighing capacity.

Now, if through handle 119, wheel 116 is rotated, causing pinion 114 to rotate gear element 70, and the element 80, to positions wherein a low portion 92b of cam surface 92 is presented to the cam follower 102d, then the consequent movement of lever arm 102, through gravity bias, pivotable about rod 98, in response to movement of said follower from a high portion to a low portion of the cam, would be such as to place end portion 102a of lever arm 102 in the position as shown in dotted lines. Downward movement of lever arm 102 would result, through roller 102b and upper bracket 47a, in downward movement of weight rod 47, and subsequent engagement of lower bracket 47b with reduced portion 31 of carrier brace 28. It should be noted that the downward movement of end portion 102a is sufficiently greater than that necessary to permit the lower bracket to engage the carrier brace, whereby to place the end portion 102a entirely clear of upper bracket 47a. Thus, in this "weight on" position, i.e., when counterweight 42 is supported by carrier brace 28, said counterweight is effective as regards the weigh beam, and will increase the scale weighing capacity, in accordance with the relative mass of said weight.

In summary, there are two positions in which counterweight 42 can be placed, as "weight off" or "weight on." In the "weight off" position, cam follower 102d rides on a high portion 92a of cam surface 92, thereby holding lever arm 102 in a raised position supporting the weight clear of the weigh beam. In the "weight on" position, cam follower 102d rides on a low portion 92b of cam surface 92, thereby permitting lever arm 102 to drop into a lowered position and depositing the weight onto carrier brace 28, and thus the weigh beam. The previously mentioned indexing means, comprising cooperative elements 122 and 124, is a means for preventing partial rotation of element 80, whereby follower 102d would be positioned on a transitional inclined portion 92c of cam surface 92, thereby disposing lever arm 102 at a point somewhere intermediate the positions shown in solid and dotted lines (Fig. 4), and, thus, interfere with weigh beam movement, since the weight would be effective for only part of the weigh beam range of movement.

In operation, assume the scale shown has an original weighing capacity of 1,000 lbs. and the counterweights each have a relative mass equal in counterpoise relation as follows: weight 41=1,000 lbs., weight 44=2,000 lbs., weight 43=2,000 lbs., and weight 42=4,000 lbs. It should be noted, that the counterweights are designed so that each weight has a relative mass equal to a multiple of the scale capacity; also, and for purposes of description each weight, and its related cam and lever arm have the same primary or last digit, for example: weight 41, is supported by lever arm 101, which is actuated by cam 91; weight 42, is supported by lever arm 102, which is actuated by cam 92; weight 43, is supported by lever arm 103, which is actuated by cam 93; and weight 44 is supported by lever arm 104, which is actuated by cam 94.

Figure 5:
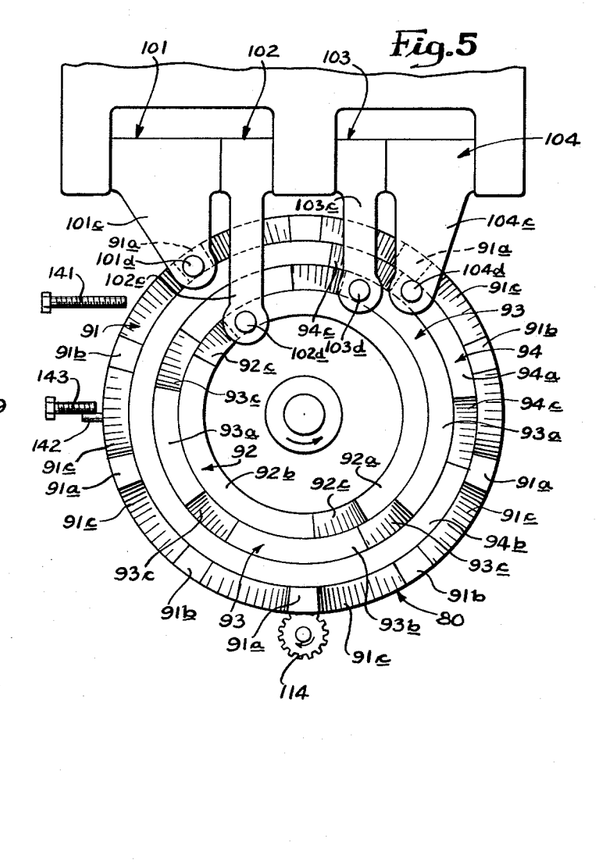
Fig. 5 is a diagrammatic view showing the concentric cam surfaces and their associated cam followers.
Figure 6:
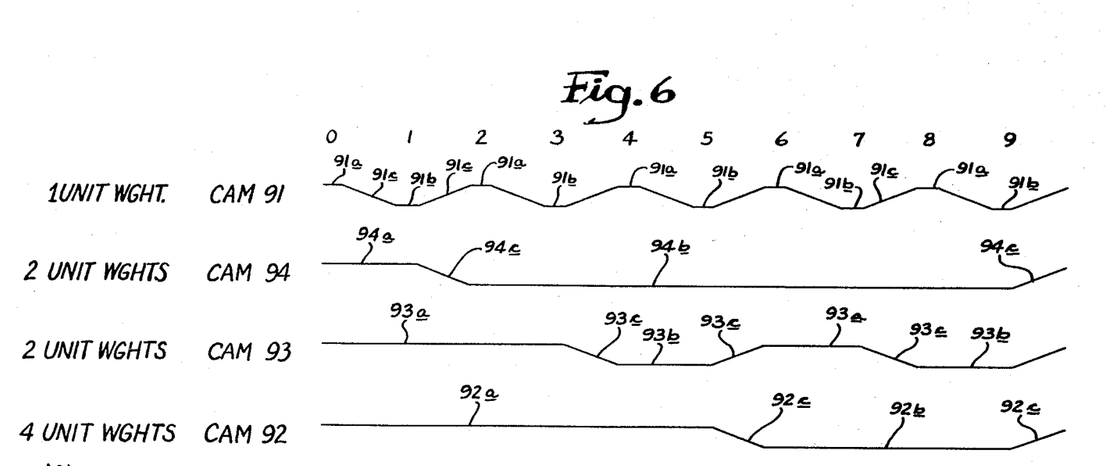
Fig. 6 is a diagrammatic view showing, in developed form, the relation of the cam surfaces for operation through a determined sequence.

Referring to the diagrammatic view of Fig. 5, each cam follower 101d, 102d, 103d, and 104d is shown riding on a high position of its respective related cam surface. This condition is that indicated graphically in Fig. 6, as "0" position, in which none of the weights are effective as regards the weigh beam, and the scale weighing capacity is 1,000 lbs. Manual operation of handle 119 to rotate wheel 116, will result, as indicated in Fig. 5, in clockwise rotation of pinion 114, causing (through previously described gear element 70) counterclockwise movement of element 80 which mounts the concentric cam surfaces 91, 92, 93, and 94. Rotation of wheel 116 to the next index position (as determined by detent elements 122 and 124) rotates the cam surfaces to a position such that low portion 91b of cam surface 91 is presented to follower 101d, whereas the remaining followers 102d, 103d, and 104d, yet ride on high portions 92c, 93c, and 94c, respectively. This condition is that indicated graphically in Fig. 6, as "1" position, in which weight 41 is now effective as regards the weigh beam, whereas the remaining weights 42, 43, and 44 remain supported by their respective lever arms. Since weight 41 has a relative mass equal to the original scale capacity (1,000 lbs.), the effect of said weight, being now supported by the weigh beam in a counterpoise relation (the mechanics of transferring the weight being heretofore described), is to increase the scale capacity by 1,000 lbs., for a total weighing capacity of 2,000 lbs.

Upon further rotation of wheel 116 to the next index position, the cam surfaces are moved to a position such that low portion 94b of cam surface 94 is presented to follower 104d, whereas the remaining followers 101d, 102d, and 103d, ride on high portions 91c, 92c, and 93c, respectively. This condition, indicated as "2" position in Fig. 6, is such that weight 44 is supported by the weigh beam, whereas the remaining weights 41, 42, and 43 are supported by their respective lever arms. Since weight 44 has a relative mass equal to twice the original scale capacity, or 2,000 lbs., the effect of said counterweight is to increase the scale capacity by 2,000 lbs., for a total weighing capacity of 3,000 lbs.

Figure 7:
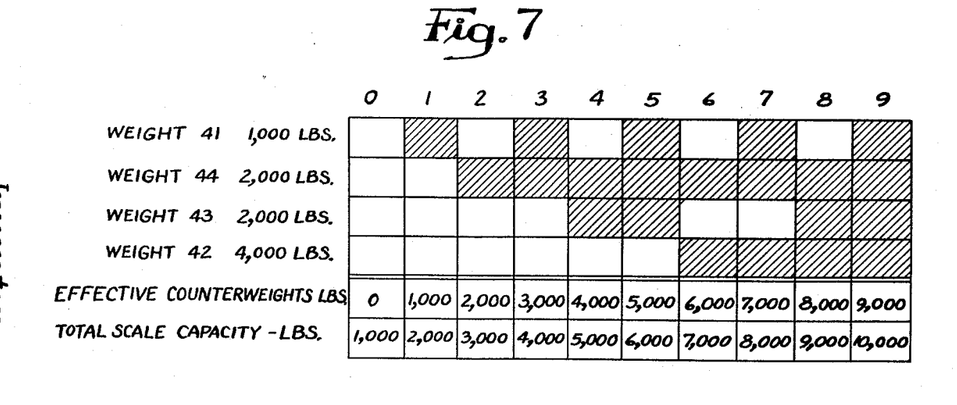
Fig. 7 shows a table which charts the cam sequence indicating the effective weights at each stage of said sequence, and the respective scale capacity.

Upon continued rotation of wheel 116 to subsequent index positions, high and low portions of the cam surfaces are presented to their respective followers in the sequence indicated by Fig. 6. The effect, or result, of this sequence is illustrated in Fig. 7 which charts the sequence from "0" position, or all "weights off," to "9" position, or all "weights on," showing which weights are carried by the weigh beam at any particular index position, and the resultant scale weighing capacity at that condition. It will be understood that said weights may be effective, singly and in combinations, in a counterweight relation, to increase the scale capacity in increments which are mutliples of the scale capacity; thus, if the original scale capacity is 1,000 lbs., an effective sequence of said four counterweights would increase the scale capacity 1,000 lbs. for each step in the sequence, until all the counterweights are effective, in which case the total counterweight effect would be an increase in scale capacity of 9,000 lbs., for a maximum scale capacity of 10,000 lbs.

Referring now to Figs. 2, 3, and 4, there is shown a wire 126, which, through an arrangement now to be described, operates the back chart, or auxiliary dial 15, to alter the readable front chart capacity so as to indicate the actual weighing capacity of the scale as determined by the effective counterweights. As shown in Fig. 4, shaft 65 to which gear element 70 is keyed (and thus cam carrying element 80), has a portion 65a extending beyond plate 61, and to which is fixed a wheel or pulley 127. Wire 126, which has one end thereof fixed to wheel 127, as by pin 128, runs around tilted wheel 130, mounted by bracket 131 to plate 61, over idler 132, around drum 133, and is secured to one end of a helical spring 135, said spring being suitably secured at its other end to support member 52, as at 136. As viewed in Fig. 3, and assuming the mechanism to be at "0" position, movement of the cam mechanism through the counterweight sequence above described, will rotate wheel 127 counterclockwise, causing wire 126 to wind about said wheel. Winding of the wire onto wheel 127 causes rotation of drum 133, which through its associated shaft 138 and gear-rack arrangement, indicated at 139, rotates the back chart 15 a corresponding proportionate distance. In a well known manner, this back chart movement is reflected in a change of numerals visible through windows 14a of front chart 14 (Fig. 1).

As best seen in Fig. 2, movement of the wire as above described is done in opposition to helical spring 135, i.e., said spring is extended from its normal position to accommodate said movement. In an extended condition the spring tends to return to normal position, and thus offers a continuous force or pull on said wire, so that when wheel 116 is rotated in a direction (clockwise) opposite to that already described (counterclockwise), movement of the wire in a reversed direction is assured, with consequent appropriate rotation of drum 133.

Because of this wire and spring type arrangement for transmitting actual weighing capacity changes to corresponding chart changes, it is necessary that rotation of shaft 65 be limited to prevent distortion of spring 135 beyond its tensile limits. Thus, although, the cam surfaces and their associated parts, are capable of continuous operation in one direction (thus, repeating the sequence, or proceeding to a given position), for the reason above stated, a stop member 141 is positioned so as to cooperate with a stud 142 fixed to element 80 to limit any further counterclockwise movement beyond the "9" position (Figs. 3 and 5); likewise stop member 143 provides a limit for clockwise movement.

It should be apparent, from the foregoing description, that this cam actuated lever mechanism for changing the scale weighing capacity, is both efficient and compact. Through the use of four counterweights, singly and in combinations, the original scale capacity of 1,000 lbs. can be increased in steps of 1,000 lbs. each, to a total weighing capacity of 10,000 lbs. The mechanism utilized is of such a nature that it can be adapted to existing scale structures with comparative ease; it requires little or no maintenance and is simple to dismantle should such action be necessary.

While the foregoing specification sets forth the invention in specific terms, it is to be understood that many variations and modifications may be resorted to without departing from the broad aspects of the invention as defined by the following claims.

Having now described the invention, what is claimed is:

1. In a weighing scale having a weigh beam, counterweight apparatus for increasing the weighing capacity of the scale, including a plurality of counterweights, a carrier supported by the weigh beam and affording support for said counterweights, a plurality of bell crank-like levers constructed and arranged to be pivoted in a path so that a first arm of each of said bell crank-like levers deposits and removes said counterweights with respect to said carrier, a unitary cam plate rotatable by a control handle, cam surfaces arranged in a concentric manner on the face of said cam plate, to be rotated by said control handle, and adjustable cam followers connected respectively to a second arm of said bell crank-like levers and adapted to be actuated by said cam surfaces whereby to pivot said levers in a predetermined sequence.

2. In a weighing scale having a weigh beam, a plurality of counterweights each adapted to be applied to said beam, a plurality of bell crank-like levers, a first arm of each of said bell crank-like levers normally supporting a counterweight clear of the weigh beam, adjustable cam followers connected respectively to a second arm of each of said bell crank-like levers, a unitary cam plate disposed adjacent said followers and arranged to provide a cam surface for each follower, said cam surfaces being formed in a concentric manner on the face of said cam plate and related one to the other in their high and low positions as to provide a determined sequence of cam follower actuation, to pivot the respective bell crank-like levers in a path to deposit and remove counterweights, singly and in combinations, with respect to said weigh beam, and means for effecting operation of said cam plate.

3. In a weighing scale having a weigh beam, counterweight apparatus for increasing the weighing capacity of the scale, including a plurality of counterweights in side by side arrangement, a carrier supported by the weigh beam and affording means to support said counterweights, a plurality of bell crank-like levers individually associated with each of said counterweights and having a common pivotal axis constructed and arranged to be pivoted in a path to deposit and remove said counterweights with respect to said carrier, a unitary cam plate formed with a plurality of cam surfaces on the face of said plate operatively associated with said bell crank-like levers for causing pivoting of said levers, said unitary cam plate being operable in steps, and upon operation to each step causing movement of one or more of said levers so that a first arm of each of said bell crank-like levers deposits or removes the respective counterweight associated with each such lever to or from the carrier, and means for effecting operation of said plate.

4. In a scale, in combination, weighing mechanism including load receiving means, a pivoted weigh beam, means operatively connecting said load receiving means to said weigh beam at one side of the fulcrum thereof, counterweight apparatus for increasing the weighing capacity of the scale, including a carrier pivotally connected to said weigh beam on the opposite side of its fulcrum, and affording means for supporting counterweights, a plurality of counterweights, means for controlling carrier application of said counterweights, including bell crank-like pivotally mounted levers a first arm thereof supporting each of the counterweights, said bell crank-like levers having a common axis of rotation and being pivotable in a path so that said first arm deposits and removes said counterweights with respect to said carrier, each of said bell crank-like levers having a second arm thereof provided with an adjustable cam follower, a unitary cam plate disposed adjacent said cam followers, and having cam surfaces arranged in a concentric manner on the face of said plate whereby each cam follower engages a different cam surface, said cam surfaces being formed to actuate the followers in a predetermined sequence, whereby pivoting of the bell crank-like levers will deposit and remove counterweights with respect to said carrier, singly and in combinations, and control means connected to said cam plate for operation thereof.

5. In a scale, in combination, weighing mechanism including load receiving means, a pivoted weigh beam, means operatively connecting said load receiving means to said weigh beam at one side of the fulcrum thereof, counterweight apparatus for increasing the weighing capacity of the scale, including a carrier pivotally connected to said weigh beam on the opposite side of its fulcrum, and affording means for supporting counterweights, a plurality of counterweights, means for controlling carrier application of said counterweights, including a pivotally mounted lever for each of the counterweights, said lever having a common axis of rotation and being pivotable in a path to deposit and remove said counterweights with respect to said carrier, each of said levers having an arm provided with an adjustable cam follower, a unitary cam plate operable in steps, disposed adjacent the cam followers, said cam plate having cam surfaces arranged in a concentric manner on the face of said plate, whereby each cam follower engages a different cam surface, and upon operation to each step actuating said followers in a predetermined manner, whereby pivoting of the levers will deposit and remove counterweights with respect to said carrier singly and in combinations, means for effecting operation of said cam plate, and indexing means for restricting operation of said plate to a step-by-step operation.

6. In a scale, in combination, weighing mechanism including load receiving means, a pivoted weigh beam, means operatively connecting said load receiving means to said weigh beam at one side of the fulcrum thereof, counterweight apparatus for increasing the weighing capacity of the scale, including a carrier frame pivotally connected to said weigh beam on the opposite side of its fulcrum and depending in a vertical manner therefrom, a horizontal brace constructed within said frame for supporting counterweights, a plurality of counterweights disposed within said frame, means in control of said counterweights, including a horizontally disposed pivotally mounted bell crank-like lever for each of the counterweights, a first arm of said lever normally supporting the counterweights clear of said brace, and being pivotable in a path to deposit and remove said counterweights with respect to said brace, each of said levers having a depending second arm providing a horizontally disposed adjustable cam follower, a disk member disposed in a vertical manner and having a face thereof adjacent the followers, a plurality of cam surfaces formed on said face and arranged in a concentric manner to provide a cam surface for each cam follower, said cam surfaces being formed to actuate the followers in a predetermined sequence, whereby movement of said first lever arm deposits and removes counterweights with respect to said brace singly and in combinations, and control means connected to said disk member for operation thereof.

7. In a weighing scale including a weigh beam, counterweight mechanism for controlling the weighing capacity of the scale, comprising a counterweight support on said beam, counterweights movable to and from supported engagement with said support, a unitary cam device having a circular periphery and concentric cam surfaces on one face thereof and rotatable to and between an initial position and a terminal position, and a bell crank-like lever between said cam device and each of said counterweights and engaging said cam surfaces, a first arm of each of said levers being effective in said initial position of the cam device to dispose all of the counterweights out of supported engagement with said support, and effective in said terminal position of the cam device to dispose all of the counterweights in supported engagement with said support, said cam device in positions of rotation intermediate said initial and terminal positions, effecting through said operating means disposition of less than all of said counterweights in supported engagement with said support.

8. In a weighing scale including a weigh beam, counterweight mechanism for controlling the weighing capacity of the scale, comprising a counterweight support on the beam, counterweights movable to and from supported engagement with said support, a unitary cam device having a circular periphery and concentric cam surfaces on one face thereof and rotatable to and between an initial position and a terminal position, said cam device providing separate cam tracks, and a bell crank-like lever having an arm thereof in association with a cam track and the other arm thereof in association with one of the counterweights, actuatable in accordance with its cam track for moving its associated counterweight to and from supported engagement with said support, said cam tracks being relatively arranged for actuation of said operating members upon location of the cam device in said initial position, to dispose all of the counterweights out of supported engagement with said support, and upon location of the cam device in said terminal position, to dispose all of the counterweights in supported engagement with said support, and said cam tracks upon rotational positioning of the cam device intermediate said initial and terminal positions thereof, effecting actuation of said operating members such as to dispose less than all of said counterweights in supported engagement with said support.

9. In a weighing scale including a weigh beam, counterweight mechanism for controlling the weighing capacity of the scale, comprising a counterweight support on the beam, counterweights displaceable to and from free supported engagement with said support, a unitary circular cam device rotatable to and between an initial position and a terminal position, said cam device providing separate, concentrically related cam tracks each of predetermined camming contour, bell crank-like levers individual to and operatively associated with said counterweights, each of said bell crank-like levers including an adjustable cam attached to one arm of said lever and in engagement with one of the cam tracks, and cam drive means operable for rotating the cam device selectively to said initial and terminal positions and to predetermined positions intermediate said initial and terminal positions, said cam tracks in the initial postion of the cam device, actuating said levers through the cam followers thereof, to effect disposition of all of the counterweights out of supported engagement with said support, and in the terminal position of the cam device, actuating said levers through the cam followers thereof, to effect disposition of all of the counterweights in free supported engagement with said support, and said cam tracks effecting in rotation of the cam device to any selected one of said predetermined intermediate positions, actuation of the said levers through the cam followers attached thereto, such as to effect disposition of certain of the counterweights but less than all thereof, in free supported engagement with said support.

10. In a variable capacity weighing scale having a weigh beam and weight indicator means, including a fixed front chart and a cooperating rotatable back chart positionable for adapting the indicator means to directly indicate weight values in accordance with selected scale capacity, the combination therewith, of counterweight mechanism for controlling the weighing capacity of the scale, comprising a counterweight support on the weigh beam, counterweights movable to and from supported engagement with said support, a scale capacity determining unitary cam device having a circular periphery and concentric cam surfaces on one face thereof and rotatable to and between an initial position and terminal position, bell crank-like levers cooperating in a manner that one arm thereof is associated with said cam device and the other arm thereof engages one of each of the counterweights, effective in said initial position of the cam device to dispose all of the counterweights out of supported engagement with said support, and effective in said terminal position of the cam device to dispose all of the counterweights in supported engagement with said support, the cam device in positions of rotation intermediate said initial and terminal positions, effecting through said lever arms disposition of less than all of the counterweights in supported engagement with said support, and an operating connection between said cam device and said movable back chart for positioning the back chart in accordance with the scale capacity determining position of the cam device.

References Cited in the file of this patent

UNITED STATES PATENTS

| | | |
|---|---|---|
| 1,823,306 | Whitney | Sept. 15, 1931 |
| 1,944,071 | Essmann | Jan. 16, 1934 |
| 2,369,179 | Roper | Feb. 13, 1945 |
| 2,387,242 | Carliss | Oct. 23, 1945 |
| 2,724,585 | Bradley et al. | Nov. 22, 1955 |
| 2,764,400 | Mettler | Sept. 25, 1956 |
| 2,851,262 | Hoffmanns | Sept. 9, 1958 |